United States Patent [19]
O'Brien et al.

[11] Patent Number: 5,664,205
[45] Date of Patent: Sep. 2, 1997

[54] POWER MANAGEMENT CONTROL TECHNIQUE FOR TIMER TICK ACTIVITY WITHIN AN INTERRUPT DRIVEN COMPUTER SYSTEM

[75] Inventors: Rita M. O'Brien; Michael T. Wisor, both of Austin, Tex.

[73] Assignee: Advanced Micro Devices, Inc., Sunnyvale, Calif.

[21] Appl. No.: 700,129

[22] Filed: Aug. 20, 1996

Related U.S. Application Data

[63] Continuation of Ser. No. 156,888, Nov. 23, 1993, abandoned.
[51] Int. Cl.$^6$ ..................................................... G06F 13/00
[52] U.S. Cl. ......................................................... 395/750.04
[58] Field of Search ............................... 395/750; 364/707

[56] References Cited

U.S. PATENT DOCUMENTS

| | | | |
|---|---|---|---|
| 4,716,523 | 12/1987 | Burrus, Jr. et al. | 364/200 |
| 5,136,180 | 8/1992 | Caviasca et al. | 307/269 |
| 5,167,024 | 11/1992 | Smith et al. | 395/375 |
| 5,237,699 | 8/1993 | Little et al. | 395/750 |
| 5,423,045 | 6/1995 | Kannan et al. | 395/750 |

OTHER PUBLICATIONS

"MCS–80/85"™ Family User's Manual, Intel Corporation 1979.

*Primary Examiner*—Ayaz R. Sheikh
*Assistant Examiner*—John Travis
*Attorney, Agent, or Firm*—Conley, Rose & Tayon; B. Noel Kivlin

[57] ABSTRACT

A power management unit is provided that monitors various portions of a computer system and causes a reduction in the frequencies of the CPU clock signal and the system clock signal during a power conserving state. The power management unit includes a programmable counter for allowing the system designer to vary the length of a wake-up period that occurs in response to an assertion of a timer tick interrupt. An in-service register of an interrupt controller is coupled to the power management unit which thereby allows the power management unit to receive real-time information regarding whether a timer tick interrupt is currently being serviced by the microprocessor. When a timer tick status bit of the in-service register is set, the power management unit causes the CPU clock signal and the system clock signal to be driven at maximum frequencies. When the timer tick status bit clears, the programmable counter begins counting. The power management unit advantageously causes the clock signals to be driven at the maximum frequencies for a length of time as determined by the programmable counter, and subsequently causes the clock signals to be driven at the reduced power-conserving frequencies when the counter expires. By accurately controlling the wake-up period of the computer system in this manner, a reduction in the overall power consumption of the computer system can be attained.

18 Claims, 1 Drawing Sheet

POWER MANAGEMENT CONTROL TECHNIQUE FOR TIMER TICK ACTIVITY WITHIN AN INTERRUPT DRIVEN COMPUTER SYSTEM

CROSS-REFERENCE TO RELATED APPLICATION

This application is a continuation of U.S. patent application Ser. No. 08/156,888, filed Nov. 23, 1993, now abandoned.

BACKGROUND OF THE INVENTION

1. Field of the Invention

This invention relates to computer systems and more particularly to interrupt controllers and power management within computer systems.

2. Description of the Related Art

An on-going developmental goal of manufacturers has been to reduce the power consumption of computer systems. Reducing power consumption typically reduces heat generation of the system, thereby increasing reliability and decreasing cost. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMU's). One specific power reduction technique involves the capability of stopping clock signals that drive inactive circuit portions. A system employing such a technique typically includes a power management unit that detects or predicts inactive circuit portions and accordingly stops the clock signals associated with the inactive circuit portions. By turning off "unused" clock signals that drive inactive circuit portions, overall power consumption of the system is decreased. A similar technique involves the capability of reducing the frequency of clock signals that drive circuit portions during operating modes which are not time critical.

The power management techniques of stopping and/or reducing the frequency of selected clock signals as described above are frequently employed within interrupt driven systems. In an interrupt driven system, peripheral and I/O devices such as keyboards, displays, timers, sensors and other components execute certain tasks independently of the central resource or microprocessor, but require communication with the microprocessor at irregular, random, and therefore asynchronous intervals. In such systems, a particular peripheral or I/O device generates an interrupt signal which is passed on to the microprocessor via a dedicated interrupt line or channel to request that the microprocessor interrupt its processing and service the particular peripheral or I/O device. Upon detecting an active interrupt request, the microprocessor transfers control to service the particular request.

A microprocessor typically services many peripheral devices over a single input-output channel which can only be utilized by one peripheral at a time. Consequently, a priority is assigned to the various peripheral devices to discriminate between concurrent interrupt requests to service the most urgent before the others. Conventional systems have dealt with the problem of multiple interrupt sources by providing an interface circuit between the microprocessor and the peripherals to centrally sort, prioritize and control the interrupt sequencing. One such circuit is the 8259A series programmable interrupt controller manufactured by Advanced Micro Devices, Inc. and described in the publication "MOS Microprocessors and Peripherals"; pp. 3–371 through 3–388 (Advanced Micro Devices, Inc. 1987). This publication is incorporated herein by reference in its entirety.

Most interrupt controllers handle interrupt requests from eight or more peripherals or I/O devices. Each interrupt source is provided an interrupt service routine at a specified vectoral address for servicing the interrupt request. Each interrupt source has its own interrupt request line, and programmable. controllers such as the 8259A allow for identification and prioritization of the various sources upon system initialization. In typical operation, the interrupt controller recognizes interrupt requests and passes the highest priority request to the microprocessor, while holding lower priority requests until the processor has completed servicing the interrupt in progress.

When a power management unit within an interrupt driven system has stopped or reduced the frequency of the clock signals associated with, for example, the microprocessor, the memory subsystems, and/or other peripherals, the power management unit typically monitors the interrupt request lines to detect subsequent system activity. If an interrupt request signal is detected, the power management unit re-starts or increases the frequency of the clock signals of the microprocessor and other peripheral components to thereby allow prompt execution of the interrupt service routine. Since the power management unit is typically unaware of when a particular interrupt service routine has completed, the power management unit re-stops or reduces the frequency of the clock signals after an estimated period of time has elapsed.

An event that involves special consideration with respect to power management is the occurrence of a timer tick interrupt. A timer tick interrupt, also referred to as the system "heartbeat", is an interrupt generated by a timing unit for maintaining time keeping functions within the computer system. The timer tick interrupt occurs 18.2 times per second within a typical computer system, regardless of other system activity. When the timer tick interrupt is received by the microprocessor, a timer tick service routine is executed which, for example, updates system clocks, etc. Since (contrary to the occurrence of most other interrupt request signals), the occurrence of a timer tick interrupt is not correlated with a probability of further system activity, the power management unit usually treats a timer tick interrupt specially by "waking up" the computer system (that is, by restarting selected clock signals and/or raising the frequency of selected clock signals) for 120 microseconds. The power management unit subsequently causes the computer system to return to a "dozing" state during which the selected clock signals are again stopped and/or slowed. Unfortunately this estimated wake-up time period is often inaccurate and thus leads to wasted system power.

SUMMARY OF THE INVENTION

The problems outlined above are in large part solved by a power management control technique and computer system according to the present invention. In one embodiment, a power management unit is provided that monitors various portions of the computer system and causes a reduction in the frequencies of the CPU clock signal and the system clock signal during a power conserving state. The power management unit includes a programmable counter for allowing the system designer to vary the length of a wake-up period that occurs in response to an assertion of a timer tick interrupt.

An in-service register of an interrupt controller is coupled to the power management unit which thereby allows the power management unit to receive real-time information regarding whether a timer tick interrupt is currently being serviced by the microprocessor. When a timer tick status bit of the in-service register is set, the power management unit causes the CPU clock signal and the system clock signal to be driven at maximum frequencies. When the timer tick status bit clears, the programmable counter begins counting. The power management unit advantageously causes the clock signals to be driven at the maximum frequencies for a length of time as determined by the programmable counter, and subsequently causes the clock signals to be driven at the reduced power-conserving frequencies when the counter expires. By accurately controlling the wake-up period of the computer system in this manner, a reduction in the overall power consumption of the computer system can be attained.

Broadly speaking, the present invention contemplates a computer system comprising a peripheral device capable of asserting an interrupt request signal and an interrupt controller including at least one interrupt request line for receiving the interrupt request signal. The interrupt controller includes a control circuit capable of generating a microprocessor interrupt signal in response to the assertion of the interrupt request signal and an in-service register for storing data indicative of whether a particular interrupt request is currently being serviced by a microprocessor. A power management unit is coupled to an output line of the in-service register, wherein the power management unit controls a clock signal or the power provided to a computer subsystem depending upon the data stored within the in-service register.

The present invention further contemplates a power management unit for a computer system comprising a clock control unit capable of asserting a first control signal for reducing the frequency of a clock signal, a system monitor unit coupled to the clock control unit for detecting an inactive state of the computer system and capable of causing the clock control unit to assert the first control signal in response to the inactive state, and an interrupt detection circuit coupled to the clock control unit for detecting whether a timer tick interrupt has occurred within the computer system and capable of causing the clock control unit to deassert the first control signal when an occurrence of the timer tick interrupt is detected. The power management unit further comprises a programmable timer coupled to the clock control unit, wherein the programmable timer controls a time duration during which the first control signal is deasserted.

BRIEF DESCRIPTION OF THE DRAWING

Other objects and advantages of the invention will become apparent upon reading the following detailed description and upon reference to the accompanying drawing in which.

Figure 1:
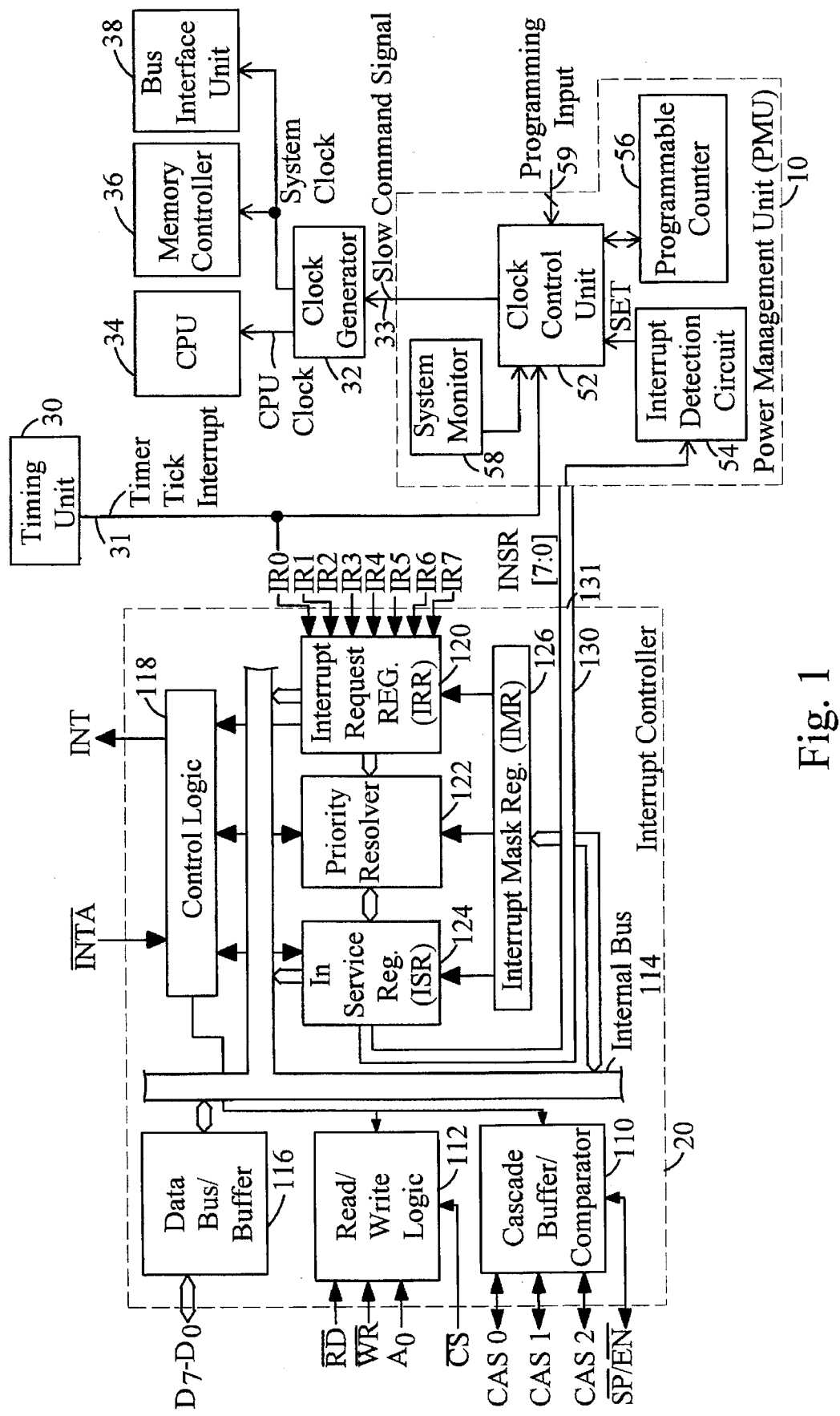
FIG. 1 is a block diagram that illustrates a computer system including an interrupt controller and a power management unit in accordance with the present invention.

While the invention is susceptible to various modifications and alternative forms, specific embodiments thereof are shown by way of example in the drawing and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawing, FIG. 1 is a block diagram of a portion of a computer system including a power management unit (PMU) 10 coupled to an interrupt controller 20 and a timing unit 30. A clock generator 32 is further shown coupled between power management unit 10 and a microprocessor (CPU) 34, a memory controller 36, and a bus interface unit 38.

Timing unit 30 is an interval timing device used for maintaining, for example, the current time and date. In this embodiment, timing unit 30 generates a timer tick interrupt signal at line 31 at a predetermined rate of 18.2 times per second.

Clock generator 32 is a circuit that generates a CPU clock signal and a system clock signal. The CPU clock signal drives microprocessor 34 and the system clock signal drives, among other things, memory controller 36 and bus interface unit 38. During the normal operating mode of the computer system, clock generator 32 generates a CPU clock signal having a maximum frequency of, for example, 80 MHz, and a system clock signal having a maximum frequency of, for example, 40 MHz. When a control signal labelled "SLOW command signal" is received by clock generator 32 at line 33, clock generator 32 slows the CPU clock signal to a frequency of 5 MHz and the system clock signal to a frequency of 2 MHz. Operation at these reduced frequencies results in decreased power consumption of the computer system.

Power management unit 10 includes a clock control unit 52 coupled to an interrupt detection circuit 54, to a programmable counter 56, and to a system monitor 58. As will be described in greater detail below, power management unit 10 monitors whether a timer tick interrupt is currently being serviced by microprocessor 34 and accordingly controls the frequency of the CPU clock signal and the system clock signal by asserting or deasserting the SLOW command signal at line 33.

Interrupt controller 20 includes a cascade buffer/comparator 110, a read/write logic circuit 112 and a data bus buffer circuit 116. Interrupt controller 20 further includes a control logic circuit 118, an interrupt request register 120, a priority resolver 122, an in-service register 124, and an interrupt mask register 126. These circuit portions will be described in greater detail below.

Interrupt controller 20 interfaces between the microprocessor 34 and one or more peripheral devices, (such as timing unit 30) which generate interrupt signals to indicate a need for servicing by the processor. The interrupt controller 20 is attached to the microprocessor as an input/output peripheral; however, various interconnections between interrupt controller 20 and microprocessor 34 have been omitted from the drawing for simplicity. Various parameters of the interrupt controller 20 such as the priority levels, interrupt signal mode, etc. may be programmed by the user to suit the particular needs of the system. Details of such programming are well-known to those skilled in the art.

Interrupt controller 20 connects to the microprocessor 34 as follows. The $\overline{CS}$ pin is a chip select input which when enabled (low) enables the read/write logic circuit 112 to permit communication between the interrupt controller 20 and the processor through a bidirectional internal bus 114, through the data bus buffer circuit 116 and through a bidirectional system data bus ($D_7$–$D_0$).

The write ($\overline{WR}$) input to read/write logic circuit 112, when enabled, permits the controller 20 to accept programming instructions from the processor. These instructions will include operating command words which set various parameters for operation of the controller 20. Enabling the read ($\overline{RD}$) input of read/write logic circuit 112 permits the microprocessor 34 to obtain data indicative of the status of controller 20, including the status of the parameters set in the initialization sequence. The $A_0$ address line in conjunction with the $\overline{WR}$, $\overline{CS}$ and $\overline{RD}$ lines of logic circuit 112 accommodate the decoding of various command words from the processor and status requests from the processor.

Data bus buffer circuit 116 is a bidirectional bus interface which permits transfer of control, status and interrupt address data between the controller 20 and the processor. The interrupt address data includes vectored pointers which identify the addresses in processor readable memory where the interrupt service routines for the particular peripheral devices are stored.

Control logic circuit 118 controls the transmittal of interrupt requests to the processor via the interrupt line (INT) sand receives interrupt acknowledge signals from the processor via the interrupt acknowledge line (INTA).

During operation of interrupt controller 20, when a valid interrupt request is asserted by a peripheral device, interrupt controller 20 causes an interrupt signal to be placed on output pin INT which is typically connected to the processor's interrupt input terminal. After receipt of an interrupt request via the INT line, the microprocessor 34 generates an interrupt acknowledge signal which is passed to control logic circuit 118 via the INTA line. An enabling signal on the INTA line causes the control logic circuit 118 to write the vectored address of the appropriate interrupt service routine to the data bus via buffer 116.

As stated previously, interrupt requests from the various peripherals are received via request lines $IR_0$–$IR_7$. These are asynchronous requests. Interrupt request register 120 receives and stores the identity of any interrupt line $IR_0$–$IR_7$ which is requesting an interrupt.

Interrupt request register 120 is connected in a cascade configuration to priority resolver 122. Priority resolver 122 is a logic circuit which compares the priority levels (programmed by the user) of the interrupt lines requesting service to those in service, latches the lower priority requests in a standby mode, and directs servicing of the highest priority interrupt.

The outputs of the priority resolver 122 are connected to the in-service register 124. In-service register 124 stores the identification of any request line IR0–IR7 that is being serviced by the processor. In the configuration shown, a timer tick status bit of in-service register 124 indicates whether a timer tick service routine is currently being executed by the microprocessor in response to a timer tick interrupt at request line IR0.

Interrupt controller 20 is configured with a bus 130 coupled to in-service register 124 for providing to externally connected devices the identification of any request line that is currently being serviced by the processor. In the embodiment shown, power management unit 10 is connected to bus 130 at a set of terminals 131 of the interrupt controller 20. It is noted that the interrupt controller 20 is fabricated on an integrated circuit chip and that the set of terminals 131 are external pins of the integrated circuit chip. As will be explained in further detail below, power management unit 10 monitors the timer tick status bit of in-service register 124 to control frequency of the various clock signals when a timer tick interrupt occurs.

The operation of power management unit 10 is next considered. During operation of the computer system, the system monitor 58 monitors various portions of the computer system to determine whether the CPU clock signal and the system clock signal may be reduced in frequency for power conservation. For example, system monitor 58 may monitor, among other things, the CPU local bus, the system peripheral bus, and the interrupt request signals. If activity is undetected for a predetermined amount of time, system monitor 58 causes clock control unit 52 to assert the SLOW command signal to thereby reduce the frequencies of the CPU clock signal and the system clock signal. System monitor 58 subsequently monitors the system to determine whether the frequency of the CPU clock signal and the system clock signal should be increased to maximum frequency.

System monitor 58 may be embodied by a variety of specific circuit configurations and may implement a variety of specific power management algorithms. An exemplary system monitor that determines appropriate times to reduce the frequencies of a CPU clock signal and a system clock signal for power management is described within U.S. Pat. No. 5,167,024 issued Nov. 24, 1992 to Smith et al. This patent is incorporated herein by reference in its entirety.

In addition to the various power management functions which may be supported by system monitor 58, power management unit 10 also includes circuitry for controlling the frequencies of the CPU and system clock signals when a timer tick interrupt is being serviced. Specifically, during operation the interrupt detection circuit 54 detects whether a timer tick service routine is currently executing within microprocessor 34 by monitoring the timer tick status bit of in-service register 124. If the timer tick status bit of in-service register 124 is set, interrupt detection circuit 54 provides a "SET" signal to clock control unit 54 which causes the SLOW command signal to be deasserted to thereby increase the CPU clock signal and the system clock signal to a maximum frequency (if they were not already operating at maximum frequency as determined by system monitor 58). When the timer tick service routine subsequently causes the timer tick status bit of in-service register 124 to clear, interrupt detection circuit 54 deasserts the SET signal to indicate that the timer tick status bit of in-service register 124 has been cleared. In response, the clock control unit 52 causes programmable counter 56 to begin counting for a pre-programmed time period. In the preferred embodiment, the programmable counter 56 may be programmed through the programming input lines 59 of clock control unit 52 such that a transistory time period within a range of 125 microseconds to 64 milliseconds will be counted. When the transitory time period as determined by programmable counter 56 lapses, clock control unit 52 reasserts the SLOW command signal which causes clock generator 32 to reduce the frequencies of the CPU clock signal and the system clock signal.

As a result, following the clearing of the in-service register, the CPU clock signal and the system clock signal continue to operate at maximum frequency for a programmable amount of time as determined by programmable counter 56. This transitory time period is provided since, although the timer tick service routine has issued an end-of-interrupt command that causes the timer tick status bit of in-service register 124 to clear, many timer tick service routines are configured such that further code constituting a portion of the timer tick service routine in fact remains unexecuted and must be subsequently executed after the end-of-interrupt command is executed. Such timer tick service routines allow other time-critical interrupts to be serviced sooner by embedding the service routine of the subsequent interrupt within the remaining portions of the timer tick service routine. The precise time required to complete the timer tick service routine as well as any embedded service routines may be determined by the system designer or programmer and may accordingly be programmed within the programmable counter 56 to allow precise power management timing and thus optimal efficiency.

Further details regarding interrupt controller 20 may be found in the commonly assigned, co-pending application Ser. No. 08/125,336 entitled "Interrupt Controller With In-Service Indication" by MacDonald et al., filed Sep. 22, 1993. This application is incorporated herein by reference in its entirety.

Numerous variations and modifications will become apparent to those skilled in the art once the above disclosure is fully appreciated. For example, although clock control unit 52 deasserts the SLOW Command signal in response to the setting of the timer tick status bit of in-service register 124, the clock control unit 54 could be alternatively configured to deassert the SLOW command signal in response to an assertion of a timer tick interrupt as detected at line 31. Furthermore, in an alternative embodiment, clock control unit 52 could be configured such that programmable counter 56 begins counting when a timer tick interrupt occurs or when the timer tick status bit of in-service register 124 is set. It is intended that the following claims be interpreted to embrace all such variations and modifications.

What is claimed is:

1. A computer system comprising:
   a timing unit configured to assert a timer tick interrupt signal;
   an interrupt controller including at least one interrupt request line for receiving said timer tick interrupt signal, wherein said interrupt controller includes a control circuit configured to generate a microprocessor interrupt signal in response to the assertion of said timer tick interrupt signal, and wherein said interrupt controller further includes an in-service register for storing data indicative of whether said timer tick interrupt signal is currently being serviced by a microprocessor; and
   a power management unit coupled to an output line of said in-service register, wherein said power management unit includes a clock control unit configured to control a clock signal such that said clock signal is driven at a first frequency when said in-service register is set and wherein said clock signal is driven at a second frequency during a power conservation mode, and wherein said power management unit further includes a programmable timer coupled to said clock control unit, wherein said programmable timer controls a time period between a time at which said in-service register has cleared and a time at which said clock control unit causes said clock signal to be driven at said second frequency and wherein said in-service register is cleared in response to an end-of-interrupt command executed by said microprocessor.

2. The computer system as recited in claim 1 wherein said clock signal is a CPU clock signal.

3. The computer system as recited in claim 1 wherein said clock signal is a system clock signal.

4. The computer system as recited in claim 1 wherein said power management unit further comprises an interrupt detection circuit coupled to said output line of said in-service register and to said clock control unit and configured to provide a signal indicative of whether a timer tick status bit of said in-service register is set.

5. The computer system as recited in claim 1 further comprising a clock generator coupled to said clock control unit, wherein said clock generator is configured to generate a CPU clock signal and a system clock signal.

6. The computer system as recited in claim 1 wherein said power management unit includes an input port for programming said programmable timer.

7. The computer system as recited claim 1 wherein said programmable timer is a programmable counter.

8. A power management unit for a computer system, said computer system including an interrupt controller having an in-service register indicative of a currently active interrupt, said power management unit comprising:
   a clock control unit configured to assert a first control signal for reducing the frequency of a clock signal;
   a system monitor unit coupled to said clock control unit for detecting an inactive state of said computer system and configured to cause said clock control unit to assert said first control signal in response to said inactive state;
   an interrupt detection circuit coupled to said clock control unit configured to detect whether a timer tick interrupt has occurred within said computer system by monitoring said in-service register, and wherein said interrupt detection circuit is configured to cause said clock control unit to deassert said first control signal when an occurrence of said timer tick interrupt is detected; and
   a programmable timer coupled to said clock control unit, wherein said programmable timer is configured to control a time at which said first control signal is reasserted following said interrupt detection circuit detecting a clearing of said in-service register in response to an end of interrupt command.

9. The power management unit as recited in claim 8 wherein said clock signal is a CPU clock signal.

10. The power management unit as recited in claim 8 wherein said clock signal is a system clock signal.

11. The power management unit as recited in claim 8 further comprising an input port configured to allow programming of said programmable timer.

12. The power management unit as recited claim 8 wherein said programmable timer is a programmable counter.

13. The power management unit as recited in claim 8 wherein said interrupt detection circuit is configured to detect a timer tick status bit of said in-service register within said computer system.

14. The power management unit as recited in claim 13 wherein said interrupt detection circuit is configured to assert a second control signal when said timer tick status bit of said in-service register is set.

15. The power management unit as recited in claim 14 wherein said clock control unit is configured to deassert said first control signal for raising the frequency of said clock signal in response to an assertion of said second control signal.

16. The power management unit as recited in claim 15 wherein said programmable timer is configured to begin counting when said second control signal makes a transition from an asserted state to a deasserted state.

17. The power management unit as recited in claim 16 wherein said clock control unit is configured to reassert said first control signal when said programmable timer reaches a terminal count value.

18. The power management unit as recited in claim 17 wherein said terminal count value is programmable.

* * * * *